Figure 2:
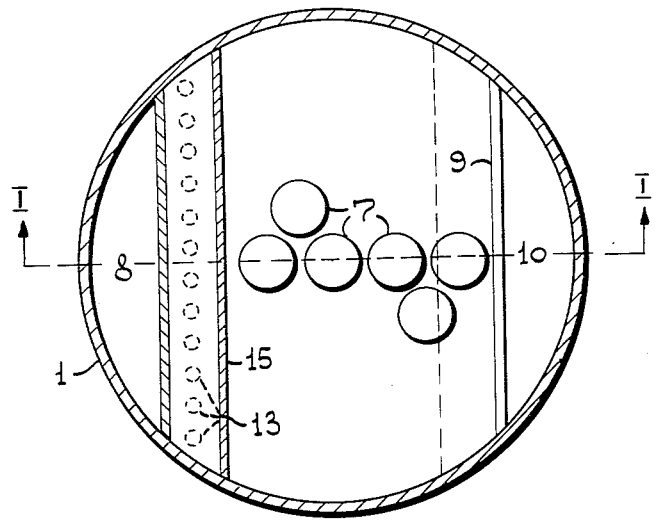

George F. Pappas
Hollister B Sykes    Inventors
Edwin C. Holmer

By W.O.J Heilman   Attorney

United States Patent Office 2,702,696
Patented Feb. 22, 1955

2,702,696

APPARATUS FOR OPERATING A COUNTERCURRENT VAPOR-LIQUID PROCESSING ZONE

George F. Pappas, Metuchen, Hollister B. Sykes, Roselle, and Edwin C. Holmer, Plainfield, N. J., assignors to Standard Oil Development Company, a corporation of Delaware Application May 16, 1951, Serial No. 226,704

2 Claims. (Cl. 261—114)

The present invention relates to an improved apparatus for countercurrently contacting vapors and liquid or for contacting granular solids with either vapors or liquid. The invention is exemplified by an improved multi-stage fractionating zone and is of particular application to contacting upflowing vapors and downflowing liquid wherein bubble cap trays or their equivalent are employed in conjunction with liquid downcomers. In accordance with the present invention, means are provided for obtaining jet aeration at the liquid inlet end of a bubble cap tray and of simultaneously off-setting the increased entrainment of fluid brought about by the operation of the jets.

This invention will be described with particular reference to the contacting of vapors and liquids. However, it is to be understood that the apparatus disclosed may be employed in contacting solids with liquids or solids with vapors.

It is well known in the art to conduct many chemical reactions and separations wherein vapor and liquid are contacted in a countercurrent manner, as for example in a hydrocarbon fractionation zone. Normally, the liquid passes from one zone to a lower zone by passing transversely over a bubble cap plate or equivalent, and over a weir into a liquid downcomer or its equivalent. The vapors pass upwardly from a lower zone or stage through chimneys and bubble caps or their equivalent into the liquid phase which is passing transversely across the upper plate. The height of the liquid phase on the respective trays is determined by the height of the overflow weir. The downcomer from the upper zone must of necessity extend below the top of the weir or the liquid phase on the lower tray or zone, thus sealing the downcomer in order to prevent vapors from passing upwardly in the downcomer.

In liquid-gas contacting operations in a bubble-tray type tower of this character, the maximum gas rates for any given liquid rate are limited by flooding of the trays, and/or excessive liquid entrainment from tray to tray. Either of these conditions may occur first or they may occur simultaneously depending upon the liquid rate and the design of the tray. However, once either condition occurs, side effects develop tending to produce the other condition.

Flooding of the trays quickly leads to flooding of the tower and liquid carryover from the top of the tower. Tray flooding may be initiated by filling of the downcomer, or back up of the liquid from the downcomer entrance due to inadequate entrance area to handle the amount of aerated liquid entering. Either factor causes the liquid holdup on the tray to increase and this in turn promotes increased entrainment.

Excessive entrainment impairs the contacting efficiency of the tower. It also increases the tray pressure drops and liquid loadings on the trays. These latter factors in turn increase the liquid levels in the downcomers.

Filling of the downcomers is a common cause of bubble-tray tower capacity limitations. The effective liquid level in a given downcomer leading from a given tray A to tray B below it is determined by the liquid head at the inlet of tray B, the pressure drop across tray A, the frictional energy loss of the liquid when passing from the downcomer onto tray B, and the degree of aeration (density) of the downcomer liquid.

The inlet head is a measure of what is referred to as the "hydraulic gradient" on the tray, since the "gradient" may be defined as the difference between the tray inlet and outlet liquid heads. This gradient represents potential energy which is dissipated as kinetic energy in overcoming frictional effects during passage of the liquid across the tray.

In accordance with this invention, the tendency to tray flooding and consequent excessive entrainment from tray to tray is minimized by providing vapor jets adjacent the downcomer extending from the next higher tray. The vapor jets provide kinetic energy to aid the passage of liquid across the tray, reducing the downcomer liquid level. This reduction of downcomer liquid level permits operation of a given tower at higher throughputs, and minimizes tray flooding. As will be brought out, it is theorized that injection of vapor streams adjacent the downcomer is effective to increase the potential energy of liquid on the inlet side of the plate to provide the energy required to drive the liquid across the plate and in addition to provide an aspirating effect, both of which factors cause a decrease in the downcomer liquid level.

As used herein, the term "vapor jet" is employed to designate a directed stream of vapor. Thus, the vapor jets employed are sharply different from the type of vapor passage from a bubble cap. The vapor emitted from a bubble cap is sent out in all directions from the bubble cap and is not directed in any one course. For the purposes of this invention, it is essential that vapor streams are employed which are "jets" in the sense that the stream is a solid, homogeneous body of vapor directed in one direction.

Heretofore, a disadvantage of utilizing jets of this character in a fractionating zone was that an undesirable amount of liquid would be entrained in the upflowing jetted vapors which would also impair the efficiency of the treating zone. However, in accordance with the present invention, jet aeration at the inlet side of the tray is handled in a manner to offset the increased entrainment. This is secured by having baffle elements positioned above the height of the liquid phase above the jets.

Figure 1:
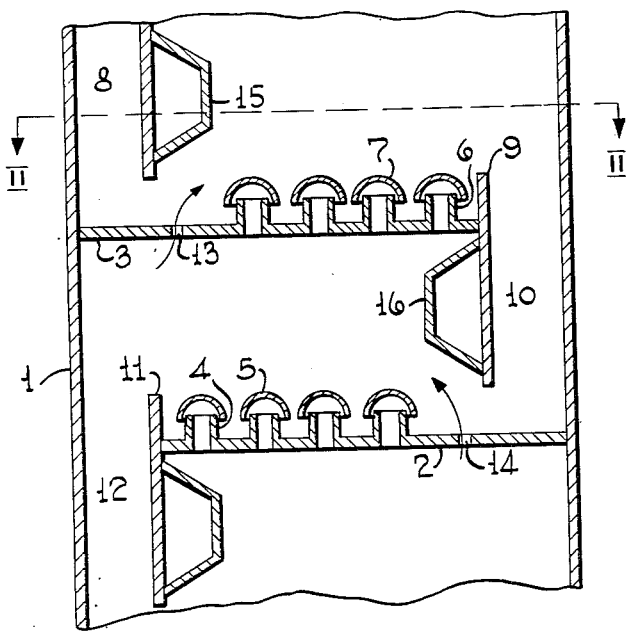
Figure 4:
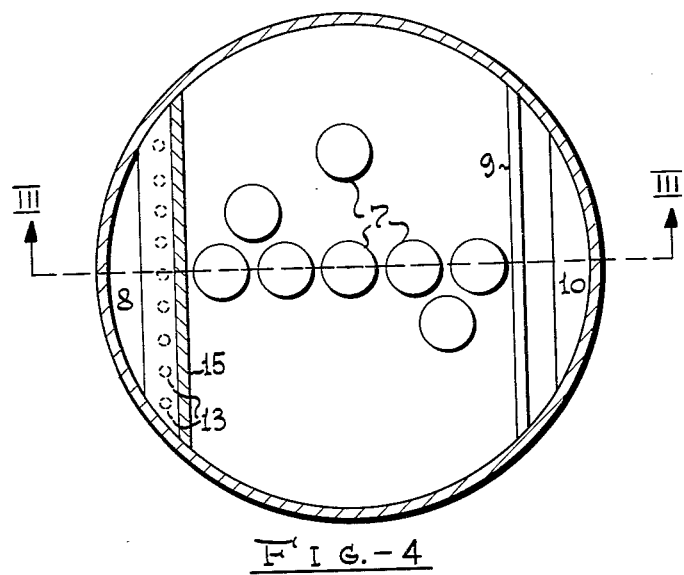
Figure 3:
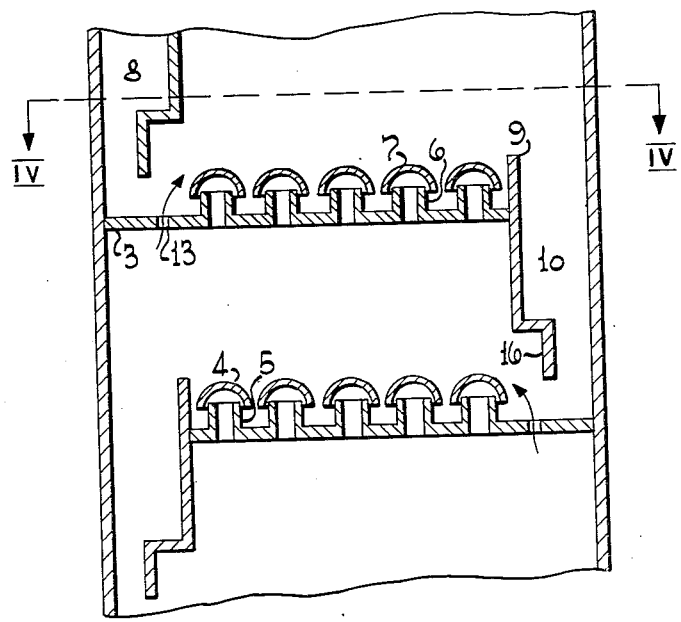

The present invention may be readily understood by reference to the drawings illustrating embodiments of the same. Figure 1 is a horizontal cross-sectional elevational view of a fractionating zone comprising two stages. Figure 2 is a top view taken through section II—II. Figure 3 is similar to Figure 1 except that different entrainment separators are shown. Figure 4 is the top view of Figure 2 taken through section IV—IV. Referring to Figures 1 and 2, the numeral 1 designates a fractionating zone comprising bubble cap trays 2 and 3. Bubble cap tray 2 has chimney elements 4 and bubble caps 5. Bubble cap tray 3 has chimneys 6 and bubble cap elements 7. Liquid flows downwardly in downcomer 8 onto tray 3. This liquid flows transversely over plate 3, across weir 9 into a downcomer 10 onto tray 2. The liquid flows transversely across tray 2, across weir 11 and to downcomer 12 wherein it flows to the zone below. In accordance with the present invention, perforations 13 are provided in plate 3 and perforations 14 in plate 4. These perforations cause upflowing vapor jets to be directed into the liquid on the inlet side of the plates adjacent the downcomer. Any liquid entrained by the jets is removed by impinging on baffle elements 15 and 16 extending over the jets.

The present invention comprises a method and device for obtaining capacity increases in bubble cap towers by promoting extreme jet aeration at the liquid inlet side of each plate without securing any significant increase in inter-tray liquid entrainment. The extreme jet aeration at the liquid inlet end of the tray is brought about by the utilization of jets, obtained by providing holes or perforations in the tray deck. It is within the concept of the present invention to equip these holes with risers in order to combat dumping of liquid through the holes. However, in all test operations to date the test data showed such risers to be unnecessary. In the simplest case in which holes are employed, any desired diameter up to about 4 to 6 inches may be used. As one of many alternatives, a slotted opening running along the plate adjacent to and parallel to the downcomer may be used. The total free space provided by the perforations, however provided may best be defined by the portion of vapor flowing therethrough. A suitable size and number of perforations are to be used to result in passage of about 5 to 25% of the total vapor. Thus, about 95 to 75% of the vapor flowing up through a given plate will flow through the conventional bubble caps of the plate, while 5 to 25% of the vapor will flow through the perforations positioned adjacent the downcomer.

The positioning of the perforations cannot be identified in terms of linear measurement, but must be expressed as being sufficiently removed from alignment below the downcomer to prevent any appreciable vapor flow upwardly into the downcomer. As the liquid flow from the downcomer across the plate and the baffles 15 or 16 tend to direct the vapor jets away from the downcomer, in actuality the perforations can be positioned just inside the inner downcomer wall.

The particular entrainment eliminator utilized may vary appreciably. The entrainment eliminator comprises a baffle element positioned above the liquid level above the hole in the tray. The element may comprise a baffle plate attachment, clamped onto an existing downcomer plate. The element may also comprise a step type downcomer with the step located at a low level near the top of the liquid level in order to act as a baffle plate as illustrated in Figure 3. It is within the concept of the present invention to employ crinkled wire mesh screen or Venetian blinds or their equivalent positioned above the holes to remove entrained liquid from the upflowing jetted vapor.

The baffle or entrainment separator 15 or 16 fulfills an important function in the apparatus of this invention. It serves to direct the upflowing vapor jets across the plate in a direction from the inlet side to the outlet side of the plate, aiding to some extent in driving the liquid across the plate. By direct impingement of the vapor jets on the baffle, entrained liquid is in large part freed from the vapor jets. The closed, boxlike form of the baffle illustrated in Figure 1 or the step type baffle of Figure 3, minimizes undesired recycling or back mixing of liquid on the plate, ordinarily occurring on splashing of liquid adjacent the downcomer.

The exact manner in which the jet aeration at the extreme liquid inlet side of a tray reduces the level in the downcomer is not fully understood. However, it is felt to be due to one or a combination of the following factors:

The flow of an appreciable portion of the liquid across the tray in the normal direction of liquid is physically aided; the liquid being aerated and hence in the form of splash and droplets increases the potential energy of the liquid available for driving the liquid across the plate. In this manner, part of the energy for overcoming frictional effects during passage of this portion of the liquid across the tray is provided. This energy would otherwise have to originate by buildup of liquid head at the inlet side of the tray with resultant downcomer level buildup. The aid to liquid flow is brought about by the initial jetting action and by the strong concurrent flow of vapor and liquid. The latter is the reverse of the well known holdup of liquid at the liquid inlet side of a tray by strong countercurrent flow of vapor and liquid. Such an effect was observed to exist on commercial towers by use of windows and relief of that condition resulted in large capacity increases.

An aspirating effect is also provided by the vapor jets, at the bottom of the downcomer. High velocity jets on the inlet side of the plate produce an aspirating effect which reduces the downcomer level.

The jets further prevent possible heavy recycling effects caused by reverse flow of highly aerated and hence elevated liquid to an upstream zone of less aeration. Provision of strong aeration immediately downstream of the downcomer plate reduces the magnitude of such reverse flow. A baffle of the nature identified further aids this objective.

The present invention may be more fully understood by the following example illustrating the same:

*Example*

A treating zone having 56 bubble caps per tray was altered by removal of 6 cap assemblies plus the chimney risers immediately adjacent the downcomer. The chimneys were 4 inches in diameter so that jet holes of this diameter were thereby provided. In one operation, the liquid feed rate was 6000 gallons per hour per foot of diameter and in another operation the liquid feed rate was 12,000 gallons per hour per foot of diameter. In both runs an increase of 15% in vapor handling capacity was obtained before tower flooding conditions were reached.

What is claimed is:

1. In a fluid contacting apparatus, a tower having vertically spaced transverse plates, each plate having an inlet for liquid on one side and an outlet for liquid on the opposite side providing for the flow of liquid across an intermediate portion of said plate from inlet to outlet, downcomers for conducting liquid from one plate to the next lower plate, chimney elements opening upwardly through each plate through the intermediate portion thereof, said chimney elements providing for the flow of a second fluid upwardly through said plate and the tower, a bubble cap for each chimney element, each bubble cap having a peripheral independent skirt normally submerged in the liquid flowing across the plate, each plate having a plurality of vertical unobstructed openings therethrough intermediate said inlet for said liquid and the initial row of chimney elements, and a flat baffle member positioned above said openings at a level higher than the plane of the bubble caps, said baffle member being inclined in such a direction as to direct the vapors away from the downcomer transversely across the plate.

2. An apparatus as defined in claim 1 wherein said flat baffle member is secured to the lower portion of a downcomer.

References Cited in the file of this patent

UNITED STATES PATENTS

| | | |
|---|---|---|
| 1,782,735 | MacKenzie | Nov. 25, 1930 |
| 1,821,619 | Day | Sept. 1, 1931 |
| 2,091,349 | Bergman | Aug. 31, 1937 |
| 2,238,824 | Ryner | Apr. 15, 1941 |
| 2,374,950 | Packie et al. | May 1, 1945 |
| 2,501,114 | Whaley | Mar. 21, 1950 |
| 2,539,142 | Kelley et al. | Jan. 23, 1951 |
| 2,560,978 | Persson et al. | July 17, 1951 |

FOREIGN PATENTS

| | | |
|---|---|---|
| 178,852 | Great Britain | July 20, 1923 |